Jan. 5, 1937. H. H. TALBOYS Re. 20,232

TRACK WRENCH

Original Filed March 20, 1933 6 Sheets-Sheet 1

Jan. 5, 1937. H. H. TALBOYS Re. 20,232

TRACK WRENCH

Original Filed March 20, 1933 6 Sheets-Sheet 2

Inventor
Henry H. Talboys
by Parker & Carter
Attorneys.

Jan. 5, 1937. H. H. TALBOYS Re. 20,232

TRACK WRENCH

Original Filed March 20, 1933 6 Sheets-Sheet 3

Inventor
Henry H. Talboys
by Parker Carter
Attorneys

TRACK WRENCH
Original Filed March 20, 1933 6 Sheets-Sheet 4
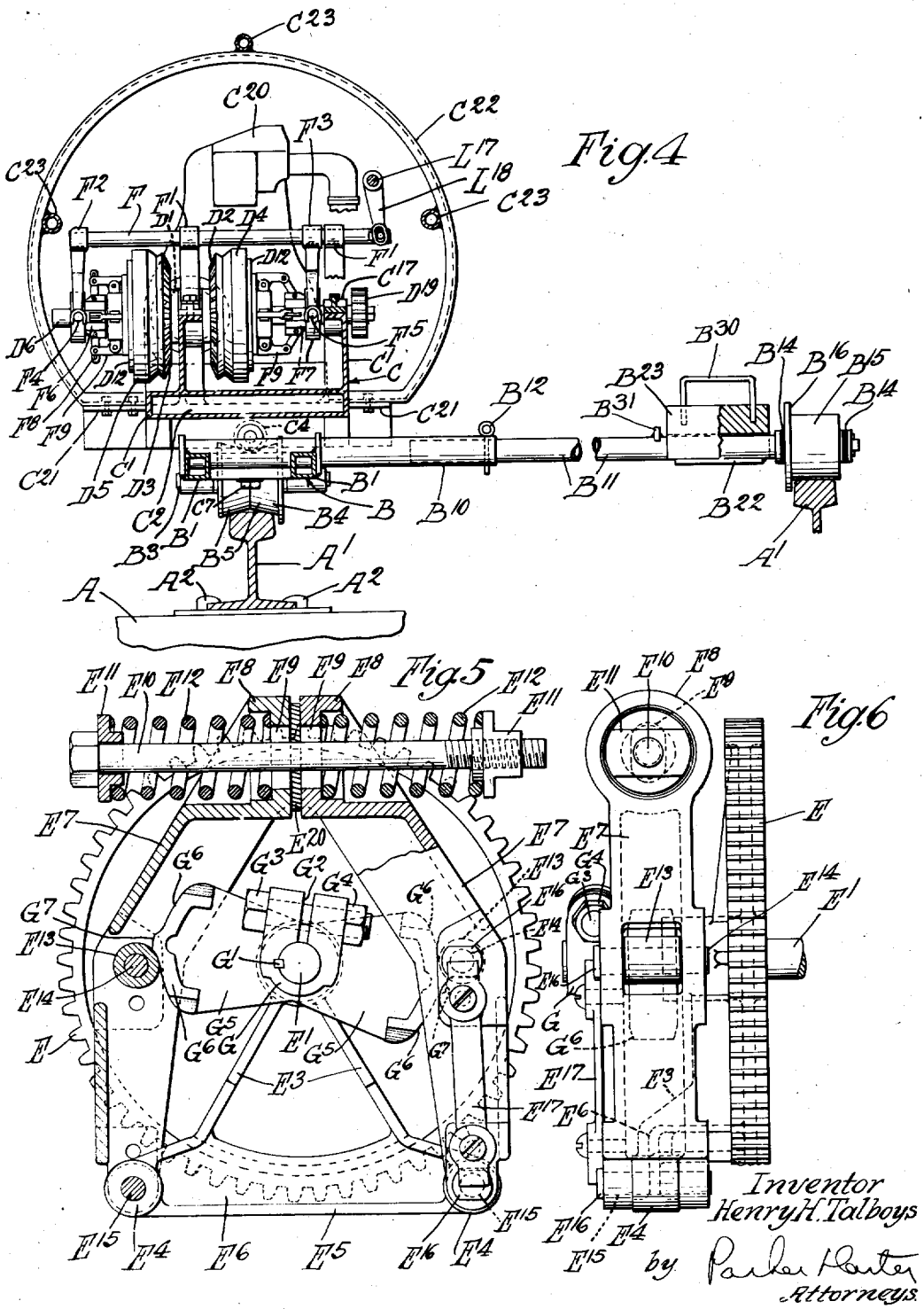

Jan. 5, 1937. H. H. TALBOYS Re. 20,232
TRACK WRENCH
Original Filed March 20, 1933 6 Sheets-Sheet 5
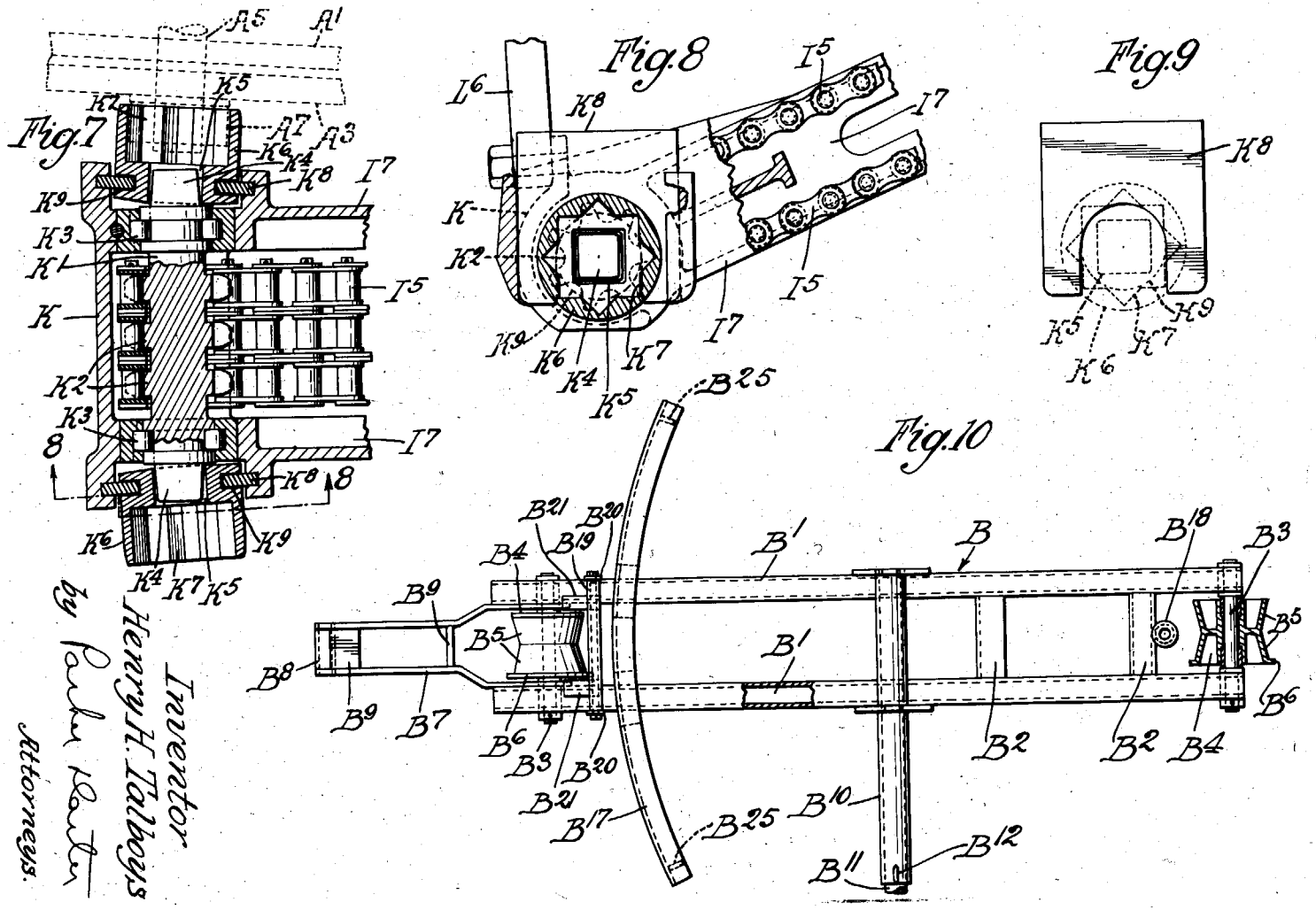
Inventor
Henry H. Talboys
by Parker Carter
Attorneys.

Jan. 5, 1937. H. H. TALBOYS Re. 20,232
TRACK WRENCH
Original Filed March 20, 1933 6 Sheets-Sheet 6
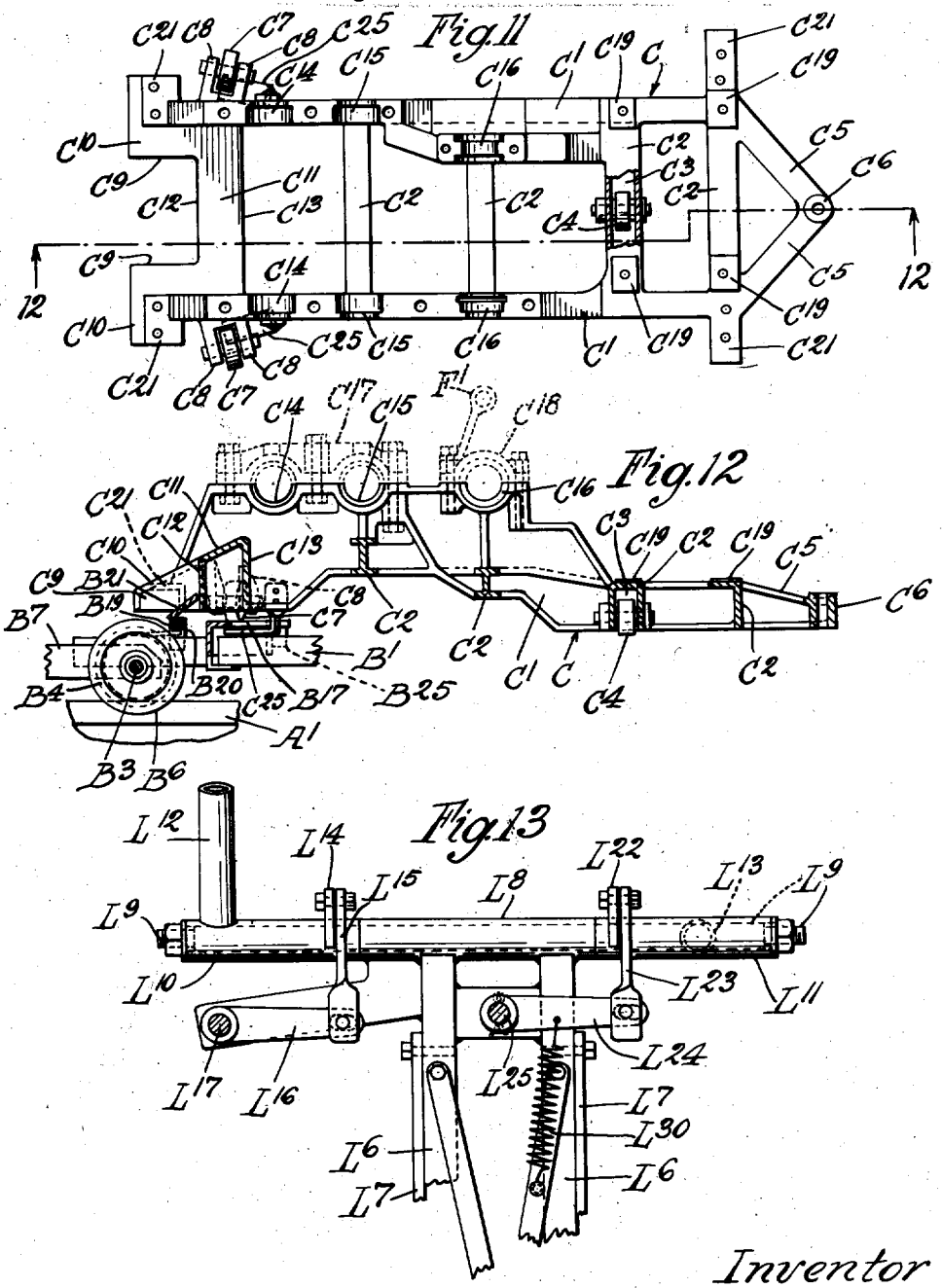
Inventor
Henry H. Talboys
by Parker & Carter
Attorneys.

Reissued Jan. 5, 1937

Re. 20,232

UNITED STATES PATENT OFFICE 20,232

TRACK WRENCH

Henry H. Talboys, Milwaukee, Wis., assignor, by mesne assignments, to Woolery Machine Company, Minneapolis, Minn., a corporation of Minnesota Original No. 1,978,513, dated October 30, 1934, Serial No. 661,764, March 20, 1933. Application for reissue March 30, 1936, Serial No. 71,812

22 Claims. (Cl. 81—54)

This invention relates to power driven portable wrenches of the type designed for travel on railway tracks, from one track joint to another, and has for its main object to provide power driven manually controlled means for operating on the nuts of the transversely axised bolts which are employed to secure the rail ends together, to run up the nuts; to tighten the nuts to a predetermined bolt tension, thus equalizing the distribution of stresses to the several bolts of a joint unit; to run off the nuts, as when new bolts are to be substituted, or a track is to be relaid; and to twist off the bolts in instances where the nut has become rusted or "frozen" to the bolt and cannot be removed by unscrewing. A further object is to design the machine so that it will be fast, efficient, and practical in operation, and also simple and easy to operate and control. Another object is the provision of improved socket means for use in the machine for engaging and turning the rail bolt nuts. Another, and important object, is to provide means, including a forwardly extending counterbalanced arm for supporting the wrench unit with a socket or chuck at each side of the arm, and with said arm mounted for adjustment about vertical and horizontal centers, whereby the sockets or chucks may be selectively applied to nuts at opposite sides of the rail, such arm being disposed over and adjustable with respect to the rail being worked upon. A further object is the provision of improved speed control, and power application and transmission features. Further and more detailed objects will be disclosed in the course of the following specification.

In the accompanying drawings illustrating a preferred embodiment of the invention:

Fig. 4 is a section on the line 4—4 in Fig. 1.

Fig. 5 is an elevation of a part of the overload release structure with parts broken away.

Fig. 6 is an end elevation of the structure shown in Fig. 5.

Fig. 7 is an enlarged section on the line 7—7 in Fig. 1.

Fig. 8 is a section on the line 8—8 in Fig. 7.

Fig. 9 is a detail of the structure shown in Figs. 7 and 8.

Fig. 10 is a plan view of the carriage or base frame of the device.

Fig. 11 is a plan view of a swinging frame mounted on said base.

Fig. 12 is a section on the line 12—12 in Fig. 11.

Fig. 13 is a section on the line 13—13 in Fig. 1.

Fig. 15 is a detail of a portion shown in Fig. 1.

Like parts are indicated by like symbols throughout the specification and drawings.

Figures 2, 14:
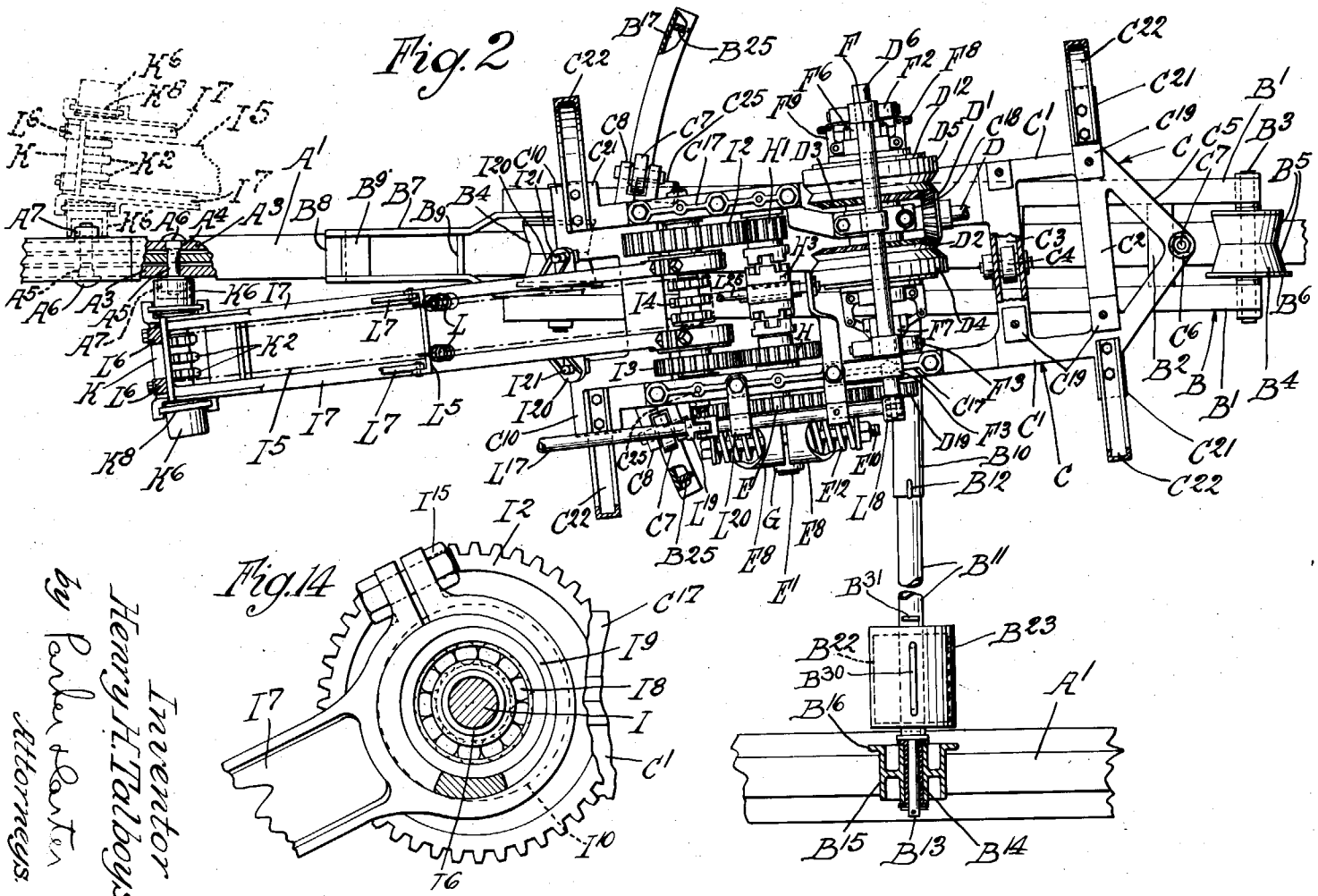
Fig. 2 is a plan view.
Fig. 14 is a section on the line 14—14 in Fig. 3.

Referring to the drawings, A indicate any suitable railway ties upon which are mounted rails $A^1$ which may be secured to the ties as by spikes $A^2$. $A^3$ indicate fish plates adapted to connect adjacent rail ends, which plates are apertures as at $A^4$ in line with corresponding apertures through the rails, which apertures may receive bolts $A^5$ with heads $A^6$ and securing nuts $A^7$. Referring to Figure 10, B generally indicates a base frame or carriage formed of a plurality of parallel tubular members herein shown as square and indicated as $B^1$ $B^1$. They may be connected by transverse braces $B^2$. The members $B^1$ are also connected by bearing pins or pipes $B^3$ upon which rotate rollers $B^4$ each of which includes a multiple conic tread $B^5$ and a single flange at one edge thereof, $B^6$. $B^7$ generally indicates a forward extension from one end of the frame which is provided at its end with a sleeve or pipe $B^8$, extending downwardly below the level of the lower portion of the frame. $B^9$ are any suitable transverse braces for the extension $B^7$. $B^{10}$ indicates a tube welded across the frame B in which is removably mounted an inner tube of somewhat lesser diameter $B^{11}$ which may be locked in position therein as by the pin $B^{12}$. It carries at its outer end a stub shaft $B^{13}$ shown in Figure 2, surrounded by an insulating sleeve $B^{14}$ about which rotates a roller $B^{15}$ inwardly flanged as at $B^{16}$. $B^{17}$ indicates a segmental track element secured to the frame B hereinafter called the outer track. One of the members $B^2$ is adapted to serve as an inner track. $B^{18}$ indicates a vertical bearing sleeve which may be welded or otherwise secured to the inner of the members $B^2$. $B^{19}$ is a locking rod rotatably mounted in upwardly extending supports $B^{20}$ and provided with locking ears or elements $B^{21}$, the purpose of which will later appear. The connection between $B^{10}$ and $B^{11}$ is preferably adjustable so that the effective length of the lateral extension between the tracks may be varied at will.

In Figures 11 and 12 is illustrated an upper carriage generally indicated as C. It includes generally parallel side frame members $C^1$ connected by a plurality of transverse members $C^2$ one of which is hollow as at $C^3$ and carries a roller $C^4$ adapted to rest upon one of the members $B^2$ of the base or frame or lower carriage B. $C^5$ is a frame supporting a bearing sleeve $C^6$ through which passes a king pin $C^7$ shown in Figure 2 which also passes through the bearing sleeve $B^{18}$, whereby the upper carriage C is pivoted to the lower carriage or base B. At the opposite end of the frame C from said sleeve $C^6$ are additional rollers $C^7$ mounted in laterally extending ears $C^8$, such rollers being adapted to ride upon the track $B^{17}$ of the lower carriage B. The end of the upper carriage is provided with opposed inner faces $C^9$ which may serve as lock abutments for the locking members $B^{21}$ when they are swung into locking position in which they are shown in Figure 12. The faces $C^9$ form the edges of inclined portions $C^{10}$ which join at the transverse bevel or inclined portions $C^{11}$ associated with downward and generally vertical faces $C^{12}$, $C^{13}$, the whole forming an end reinforcement for the upper carriage C. The side frame members $C^1$ are upwardly extended, as shown in Figure 12 the edges terminating in three bearing half sleeves $C^{14}$, $C^{15}$, and $C^{16}$. At the lower side of the structure as shown in Figure 11 a single upper member may serve to complete all three bearings. I have illustrated, however, in Figure 12, two separate members which complete the upper side of the structure of Figure 11, namely one casting $C^{17}$ which completes the bearings $C^{14}$ and $C^{15}$ and an additional casting $C^{18}$ which completes the bearing $C^{16}$, which is inwardly offset from the other. $C^{19}$ indicate bosses to which any suitable engine structure $C^{20}$ may be secured. $C^{21}$ indicate lateral extensions or lugs to which may be secured arcuate members or hoops $C^{22}$ with transverse tubular braces or supporting members $C^{23}$ the lower two of which may be extended as at $C^{24}$ to serve as handles.

Figure 3:
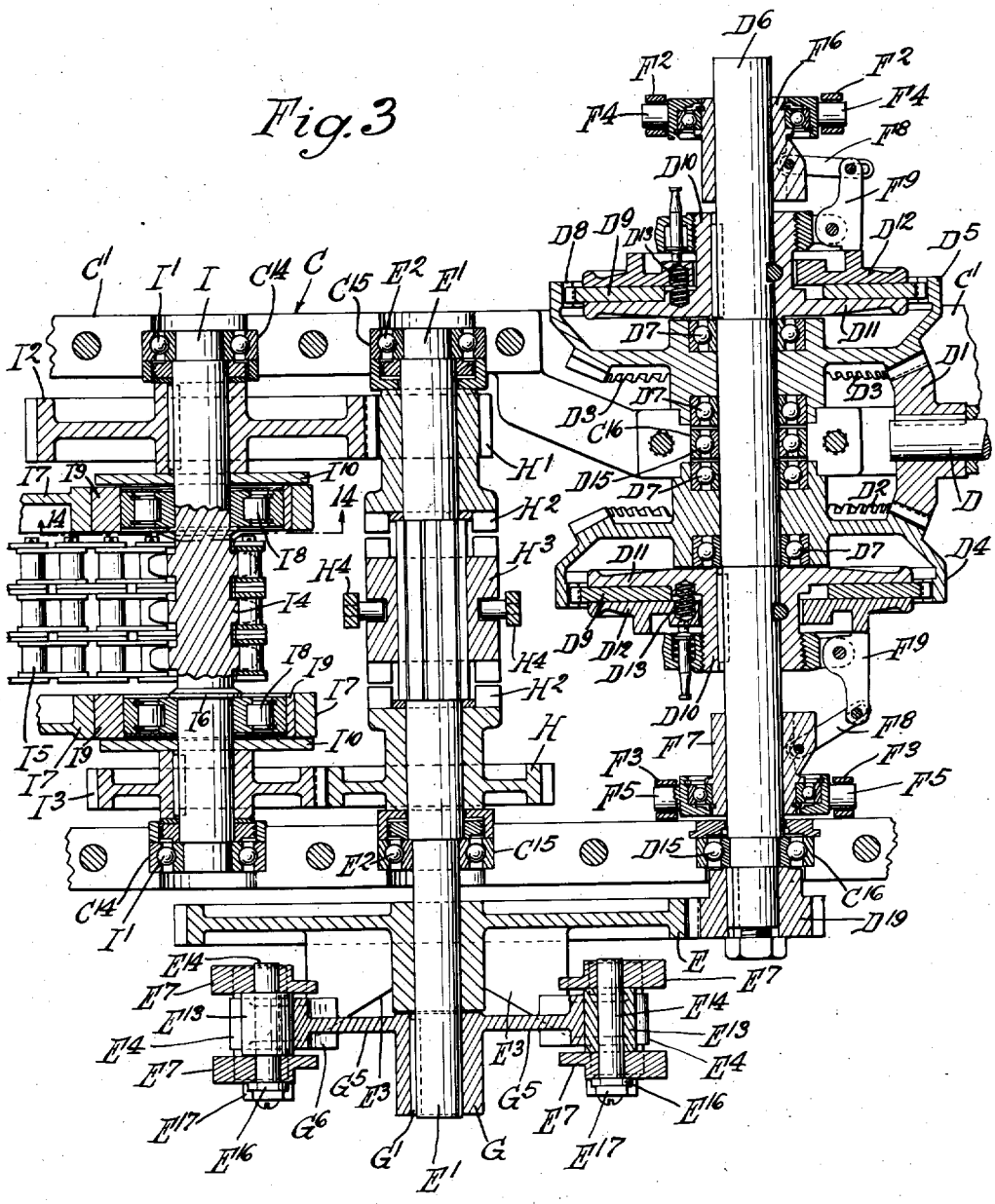
Fig. 3 is a section on the line 3—3 in Fig. 1.

Referring for example to Figure 3, D indicates the drive shaft of the engine $C^{20}$ which terminates in a bevel pinion $D^1$. It is illustrated as constantly in mesh with two bevel gears $D^2$ $D^3$ respectively. Each of these gears forms part of a clutch element having respectively the drums $D^4$ $D^5$ which rotate freely about the shaft $D^6$ upon any suitable roller bearings $D^7$ and are in the form of internal gears with teeth as at $D^8$ in mesh with toothed gear plates $D^9$. Each of these plates is associated with a hub $D^{10}$ keyed to the shaft $D^6$. Each such hub has associated with it a plate $D^{11}$ fixed to it and an opposed plate $D^{12}$ movable in relation thereto with springs $D^{13}$ tending normally to separate them. It will be understood that the two clutch members are selectively operated one at a time whereby one or the other of gears $D^2$ $D^3$ is caused by rotation of the bevel gear $D^1$ to rotate the shaft $D^6$ in opposite directions. The control may be obtained by longitudinal movement of the shaft F as shown for example in Figure 4, which slides in bearings $F^1$ and which is provided with yokes $F^2$ $F^3$ and grasping pins $F^4$ $F^5$ which control sliding sleeves $F^6$ $F^7$. Each sleeve is provided with a plurality of links $F^8$, operating levers $F^9$ which act as cams in thrusting the moving plates $D^{12}$ against the fixed plate $D^{11}$ thereby clamping the clutch plates $D^9$ and holding them against rotation. In other words, when the shaft F is moved in one direction one of the clutch plates $D^9$ is locked in position, the other being free to rotate between the then loose plates $D^{11}$ and $D^{12}$. When the shaft F is moved in the opposite direction the first clutch plate is released and the opposite clutch plate is clamped. Since the clutch assemblies are both constantly in mesh with the bevel pinion $D^1$ and are both constantly rotating the result is a rotation of the shaft $D^6$ in one direction or the other. When the shaft F is in the intermediate position there is no rotation of either of the plates $D^9$ and therefore no rotation of the shaft $D^6$. The shaft $D^6$ rotates in any suitable ball bearings $D^{15}$ seated in the bearings $C^{16}$. To the outer end of the shaft $D^6$ is secured the drive pinion $D^{19}$.

The drive pinion $D^{19}$ is in mesh with a gear E loose on the transverse shaft $E^1$, which shaft rotates in roller bearings $E^2$ in the bearing sleeves $C^{15}$.

Associated with the gear E is an overload release shown in greater detail in Figures 5 and 6. The gear E is provided with ribs $E^3$ which extend outwardly and form two bearings $E^4$ connected by a reinforcing rib $E^5$ the whole tied together by a flange or plate $E^6$. Pivoted to the bearings $E^4$ are opposite arms $E^7$ which approach each other in opposed cylindrical heads $E^8$ apertured as at $E^9$ through which aperture passes a bolt $E^{10}$ having at opposite ends thereof spring abutments $E^{11}$ one of which may be in the form of a nut for tightening the compression of the springs $E^{12}$ compressed between the abutments $E^{11}$ and the heads $E^8$ as shown in Figure 5. It will be clear that these springs tend to move the arms $E^7$ inwardly toward each other. $E^{20}$ indicates a spacing washer interposed between the heads $E^8$, the purpose of which will later appear. Each arm is provided with a roller $E^{13}$ rotating about a pin $E^{14}$. The arms $E^7$ are held in position by pins $E^{15}$ passing through the bearings $E^4$ and the forked bearings of the arms. The pins $E^{14}$ and $E^{15}$ are all shown with enlarged heads $E^{16}$ which are held in position by locking plates $E^{17}$ on the arms $E^7$.

G indicates a hub keyed to the end of the shaft $E^1$ as by the key $G^1$ but also split as at $G^2$ and clamped as by the bolt $G^3$ and nut $G^4$. Extending from each side thereof and unitary therewith are webs $G^5$ terminating in irregularly rounded cam tracks $G^6$ which are adapted to engage the rollers $E^{13}$. Each is provided with a central projection $G^7$ which engages the roller and which, in response to predetermined force or resistance, causes the rollers to override them and thereby compresses the springs $E^{12}$ and separates the ends of the arms $E^7$. It will be clear that under normal driving strains the drive from the engine will be through the pinion $D^{19}$, the gear E, the hub G to the shaft $E^1$. Normally, the gear E and the hub G rotate as a unit, the gear being free to rotate about the shaft $E^1$, but the hub G being locked for rotation with the shaft $E^1$. Therefore, as long as the gear E and the hub G are connected by the structure shown in Figure 5, they will rotate in unison as if the gear E were also locked to the shaft $E^1$. Against an overload, however, to prevent killing the engine, and also to give uniform bolt tension, and in case of need, to prevent breakage, rollers $E^{13}$ override the projections $G^7$ and in effect the driving connection between the hub G and the gear E is interrupted, thus preventing strain upon the device and breakage. This device is equally effective in either direction since upon reversal of the direction of the drive the members $G^6$ simply ride around one-half revolution and engage on the opposite side.

H $H^1$, in Figure 3, indicate respectively high speed and low speed gears free for rotation in relation to the shaft $E^1$ but provided with clutch elements or projections $H^2$ adapted for engagement with the clutch sleeve $H^3$ which is splined upon the shaft and which is controlled by any suitable clutch yoke or fork $H^4$.

Figure 1:
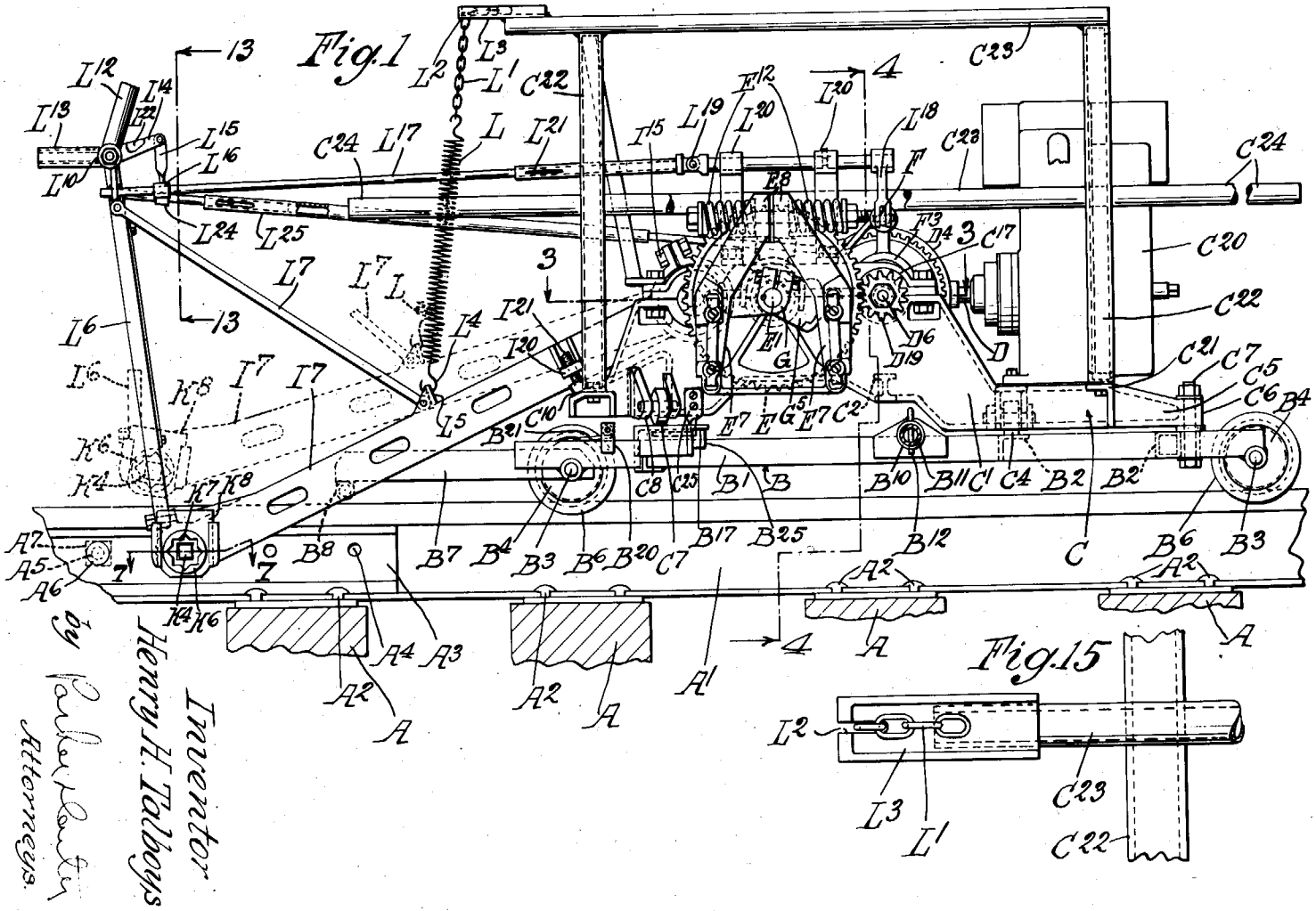
Fig. 1 is a side elevation with parts broken away.

I indicates a shaft mounted in the roller bearings $I^1$ in the bearing sleeve $C^{14}$. Keyed to it is a gear $I^2$ in mesh with the gear $H^1$ and a gear $I^3$ in mesh with the gear H. $I^4$ indicates a triple sprocket integral with the shaft I and adapted to drive any suitable flexible drive chain or the like generally indicated as $I^5$. Flanges $I^6$ guide the ends of wrench arms $I^7$ which are provided with a roller bearing connection generally indicated as $I^8$ whereby they may be rotated about the shaft I. $I^9$ indicates an eccentric effective to vary the length of the arm to take up slack of the chain $I^5$. $I^{15}$ indicates any suitable securing means such as a bolt and nut whereby the eccentric $I^9$ may be adjusted at any desired position. $I^{10}$ are bearing plates separating the wrench arms from the adjacent gears. The inner end of the wrench arm or arms is well shown in Figure 3 and the opposite end is well shown in Figures 7 and 8. The side arm sections $I^7$ are united as at K in Figures 7 and 8, a member of generally arcuate cross-section. $K^1$ indicates a sprocket shaft with integral sprocket members $K^2$ about which pass the links of the chain $I^5$. This sprocket shaft $K^1$ is mounted in any suitable roller bearings $K^3$ and is provided at each end with squared tapered end members $K^4$ which penetrate somewhat loosely a corresponding aperture $K^5$ in a socket member generally indicated as $K^6$ with its socket aperture $K^7$ formed to conform to an eight pointed star, in effect two squares angularly set. In order to hold the socket members in position they are first slipped on the squared ends $K^4$ and then the holding plates $K^8$ are dropped into position, they being formed to penetrate the circumferential slots $K^9$. The plates $K^8$ may be held by gravity in position, or any suitable locking means may be employed for locking them in place. The wrench arm $I^7$ is provided with laterally extending ears $I^{20}$ adapted to receive adjustment bolts $I^{21}$ bearing against the inclined faces $C^{10}$, as shown in Figure 1. This adjustment will permit lining up the sockets with the bolts of the particular track worked on and prevent upward lifting of either forward roller $B^4$, or rear roller $B^4$ according to the direction of rotation of the sockets. If this stop adjustment were not used one end of the machine might be lifted from the rail on a hard turn of the socket.

L indicates a spring tending normally to counterbalance and raise the wrench arm $I^7$ upwardly away from the work. The upper end of the spring may be secured as to a chain $L^1$ and effective adjustment means, the chain being adapted readily to penetrate a slot $L^2$ shown in Figure 15, in a supporting bracket $L^3$, secured to the end of one of the members $C^{23}$. The lower end of the spring L is hooked as at $L^4$ into a transverse member $L^5$ on the wrench arm $I^7$. $L^6$ are uprights secured to the end of the wrench arm and connected by braces $L^7$ with an intermediate portion of the wrench member as at the transverse member $L^5$. The uprights $L^6$ carry a sleeve $L^8$, shown in Figure 13, in which is mounted a shaft $L^9$. Rotatable about opposite ends of the shaft are sleeves $L^{10}$ $L^{11}$ which may be controlled as by the handles $L^{12}$ $L^{13}$. The sleeve $L^{10}$ is provided with a lever arm $L^{14}$ secured to a link $L^{15}$ which in turn is loosely secured to a lever $L^{16}$ adapted to rotate a longitudinally extending control shaft $L^{17}$ upon the opposite end of which is the arm $L^{18}$ which controls by a loose connection the endwise movement of the shaft F shown in Figure 4. The shaft $L^{17}$, shown in Figure 1, is provided with a universal joint $L^{19}$ and is held in bearings $L^{20}$ and is also provided with any suitable slipping or telescopic connection $L^{21}$ whereby a variation of length is permitted. The sleeve $L^{11}$ is provided with an arm $L^{22}$ secured to a link $L^{23}$ which in turn is loosely secured to an arm $L^{24}$ adapted to rotate the shaft $L^{25}$ the opposite end of which is provided with any suitable yoke or member for imparting endwise movement to the clutch member $H^3$. The yoke is diagrammatically shown as at $H^4$ as in Figure 3, it being understood that in response to rotation of the shaft $L^{25}$ the clutch member $H^3$ will be moved along the shaft $E^1$. Any suitable bearing means may be provided for the shaft $L^{25}$ and any suitable telescopic connection. I prefer normally to maintain drive through the high speed gears H and $I^3$. I therefore provide a spring $L^{30}$ adapted to move the arm $L^{24}$ in the proper direction to maintain such engagement.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

In working on railroad tracks, one frequently necessary operation in connection with laying new track or taking up or re-laying old, is the tightening and untightening of the bolts passing through rail ends and rail connecting or fish plates. Tightening or untightening these nuts and bolts manually is a tiresome, slow and expensive operation, owing to the number of bolts which must be handled and the size of the gang which is necessary to operate on them with any speed. My wrench permits a single operator to tighten and untighten bolts and nuts at maximum speed and with minimum effort, with the resultant saving in time and in labor costs.

Stated broadly, my device includes a base frame B mounted on longitudinally spaced rollers, which rides upon a rail the center of mass being generally aligned with the rail. This base frame or lower carriage is balanced by the laterally extending member $B^{10}$ $B^{11}$ which carries an insulated roller or wheel $B^{15}$ which rests on the opposite rail of the track. The center of mass of the entire device is between the two rails but only slightly within the rail over which the carriage B is positioned, so that the carriage can readily be rolled off of the track. In such case the hoops $C^{22}$ serve as rollers whereby the carriage may simply be turned upside down by a single operation by a single man, being laterally withdrawn from the track in the course of its tilting movement on the hoops $C^{22}$. Thus the single operator can readily get the wrench off of the track if a train is coming or if another piece of rail equipment is to pass. The hoops $C^{22}$ not only permit this tilting movement but serve as a species of protection for the mechanism during the tilting and also serve as ready means for the attachment of the members $C^{23}$ the ends of some of which, as at $C^{24}$, serve as handles for the ready movement of the device along the rails, or in case two or more men wish to lift the device bodily off the track.

Pivoted as at $C^7$ to the lower carriage or base member B is the upper carriage or frame generally indicated as C. The two carriages may be held against relative movement by the locking means shown in Figures 11 and 12, including the tiltable members $B^{21}$ which abut against the surfaces $C^9$ of the upper carriage. They may be so locked when the device is simply being moved along the tracks and is not in use. When the operator is using the device, however, the locking means are released so that the carriage C may be readily swung around its pivot, as it rides on its supporting rollers. Mounted on the upper carriage is any suitable power source, such as the motor generally indicated as $C^{20}$ which, through the earlier described transmission, is effective to rotate the wrench sockets $K^6$. These sockets are at the end of the wrench arm $I^7$. In use the operator swings the upper carriage C laterally in order to position the wrench arm on one side or the other of the rail he is working on. He may then thrust down manually against the spring L until he moves the wrench arm into the position in which it is shown in full line in Figure 1, at the proper level to engage the bolt ends or nuts upon which the operator is working. A lateral movement is then sufficient to move the socket member into nut engaging position. The clutch may then be actuated as by a rotation of the sleeve $L^{11}$ and the handle $L^{13}$ and the desired speed may be governed by rotation of the sleeve $L^{10}$ by means of the handle $L^{12}$. In any case, the socket member is rotated and the nut screwed on or off, as the case may be. Since the operator is finished working on a given nut he may release his normal downward pressure on the members $L^{10}$ $L^{11}$ or on the member $L^8$, and the spring L is then effective to draw the wrench arm up into the inoperative position to clear the rail, shown in dotted line in Figure 1. The effective tension of the spring may be varied by varying the position of the chain $L^1$ in the slot $L^2$, as is clear from Figures 1 and 15.

In practice, I find it valuable to provide an overload release and I employ the structure shown in Figure 1 and in considerable detail in Figures 5 and 6, and overload release which is equally effective in either direction of rotation or drive. It is in effect an adjustable disengaging means or connection between the gear E and the shaft $E^1$, being either positively in or out of engagement, like the action of a jaw clutch, the gear E being loose on the shaft $E^1$ but being connected thereto through the keyed hub G and the earlier described tripping connection. When there is such resistance to rotation that the rollers $E^{13}$ override the projections $G^7$, the effective driving connection is broken. The springs $E^{12}$, however, normally hold the parts in the position in which they are shown in Figure 5, providing a constant driving connection. When there is a change in the direction of rotation, the members $G^5$ simply rotate through something less than 180 degrees and are urged in reverse direction against the rollers $E^{13}$. As shown in Figure 5, I illustrate a washer or filler piece $E^{20}$ which is positioned between the two heads $E^8$ and which has the important function of securing a uniform overload release of the mechanism. It is effective to hold the arms $E^7$ so far apart that the rollers below described as $E^3$ will not quite touch the cam tracks $G^6$. If one of these rollers is permitted to touch the surface of the cam track $G^6$ the mechanism may turn before the rollers $E^{13}$ contact the central projection $D_7$. The interval between the two may be very slight and is therefore not indicated in the figure. This washer $E^{20}$ may if desired be made of rubber, fiber or other soft material, thereby lessening the shock on the mechanism when the springs $E^{12}$ snap the arms $E^7$ together after they have been spread by overriding the projection $G^7$.

In order to prevent any accidental unintended tilting of the device I may employ a removable counterweight $B^{23}$, which may be loosely positioned about the shaft $B^{11}$ upon a supporting plate $B^{22}$ and which may be quickly removed by the handle $B^{30}$ to reduce weight when lifting the machine. If preferred, the counterweight may be welded or fixed in place. $B^{31}$ indicates a lug welded to the member $B^{11}$, the object of which is to prevent the weight $B^{23}$ from sliding laterally on the arm $B^{11}$, when it is movably positioned thereon.

This machine is designed primarily as a maintenance tool. It will reach a nut on almost any track bolt on a rail, at forks and switch points. The machine pivots from the extreme rear end, about the bolt $C^7$, and the wrench sockets $K^8$ are set at a slight angle so that they go over the nut parallel to the axis of the bolt. I have illustrated the machine as having two speeds, depending upon whether the drive is through the gears H or $H^1$. Change from high to low speed or vice versa instantaneously is possible, or the device may be left in neutral, with the motor running.

The overload release may be set to unload at any desired torque and will so unload continuously without any change in the torque, due to the fact that the unloading or release is governed by a spring and not by friction. Therefore, the foreman can set the machine so that it will operate all day long, pulling up every bolt to the same degree of tightness, which tests show have but slight variation which may be due to the extra friction of some nuts, over others. In tightening nuts, for example, the foreman may set the device at the desired nut tightness and that is as tight as the nut can be set, because the setting of the spring causes a release when the desired tightness of the nut is reached. Thereby, the operators cannot over-tighten a nut, or twist off a bolt, when operated at high speed.

In maintenance work, if the socket member $K^6$ is put over a nut and the nut does not turn without unloading the machine, the operator does not know whether the nut is tight enough or whether it is frozen to the bolt. A quick turn of the wrist to employ the control thrusts the machine in reverse at low speed. This cracks the nut loose, and the machine may again be reversed, at high speed, and the unloading device then governs the tightening of the nut in the usual way, leaving it at a predetermined tightness or tension.

The machine is available for de-nutting or running up nuts with a rail laying gang. On de-nutting a start on low cracks the nut loose and the machine is then quickly turned into high, to run the nut off. On running the nuts up, in rail laying work, it is only necessary to do this in high, where the machine unloads at the proper point, because of the overload setting of the spings $E^{12}$.

The torque of the machine in low gear is sufficient to twist off any frozen nut on old rusted bolts, or even break the stem of such bolts. When running in reverse, to loosen a nut from a bolt, the automatic release shown in Figure 5 is out of action for the half turn following the change of direction and permits the roller to come in contact with the projection $G^7$ with a hammer blow. This subjects a frozen nut to the same effect as though a wrench were used and it were struck with a hammer. The shocks or blows tend to loosen up the frozen parts more effectively, and the momentary shock of the roller hitting the projection $G^7$, because of the inertia of the arms $E^7$ will momentarily produce a greater torque than would be occasioned by the relatively stationary position of the roller and projection $G^7$.

When direction of rotation is reversed my machine automatically loosens the chuck or socket $K^7$ from the nut, due to the reaction or snap from the overload release, coupled with a certain amount of spring continuing in the train of power of the gears and sprocket chain. In other words, a certain lost motion in the parts is of great advantage in automatically releasing the socket with a positive snap action on the nut. Furthermore, when the friction clutch or connection is released, the entire mechanism between the socket $K^7$ and the clutch is released, by virtue of the fact that there is no worm gear used in the train and that thereafter the lost motion and spring in the connecting parts are of advantage in backing up or rotating the mechanism in the direction opposite to its direction prior to the release of the clutch.

On maintenance work in practice I have found it easy to tighten two joints per minute, including the moves. In rail laying, I have found that one 4-bolt joint can easily be tightened every 50 seconds including the moving of the machine from joint to joint.

The machine is very easily moved, partly due to its light weight, and particularly to the fact that it is mounted on double cone shaped rollers which keep the wheels centered on the rail and eliminate flange friction. The ball bearing mounting for the rollers may be employed. As the rollers are only single flanged, they will ride through switches and frogs without trouble.

In order to prevent excess lateral movement of the upper carriage C, I have provided limit stops $B^{25}$ welded beneath the roller engaging flange of the segmental track $B^{17}$ which may be engaged by the angular brackets $C^{25}$ secured to either side of the upper carriage C as illustrated in Figures 1, 2, 11 and 12. Note that one end of the angular bracket $C^{25}$ extends beneath the roller engaging flange of the track $B^{17}$ of the lower carriage B preferably with sufficient clearance so as not to contact said flange. Another function of the brackets is to lift the frame B when the machine is lifted by handles $C^{24}$. Another function of the brackets $C^{25}$ is to support the forward portion of the upper carriage if the power wrench is tilted or rolled off upon the hoops $C^{22}$ giving in effect a three-point suspension by means of the two brackets $C^{25}$ and the king pin or bolt $C^7$.

I claim:

1. A device for tightening and removing horizontally axised nuts or bolts from rails, which includes a base frame movably mounted upon a rail of a track, and a power wrench mounted thereon, including an arm extending forwardly beyond the base frame and oscillatable about a generally vertical axis aligned vertically with the rail on which the base frame rides, said arm being also oscillatable about a horizontal axis, and a wrench element carried by the forward end of said arm for rotation about a generally horizontal axis, and means for rotating the wrench element.

2. A device for tightening and removing horizontally axised nuts or bolts from rails, which includes a base frame movably mounted upon a rail of a track, and a power wrench mounted thereon, including an arm mounted for lateral oscillation in relation to said base frame, about a generally vertical axis aligned vertically with the rail on which the base frame rides, said arm being also oscillatable about a horizontal axis, and a pair of wrench elements on said arm, rotatable about a generally horizontal axis, and means for rotating them, the wrench elements being oppositely and outwardly faced on opposite sides of the lower end of said arm.

3. A device for tightening and removing horizontally axised nuts or bolts from rails, which includes a base frame movably mounted upon a rail of a track, and a power wrench mounted thereon, including an arm mounted for lateral oscillation in relation to said base frame, about a generally vertical axis aligned vertically with the rail on which the base frame rides, said arm being also oscillatable about a horizontal axis, and a pair of wrench elements on said arm, rotatable about a generally horizontal axis, and means for rotating them, the wrench elements being oppositely and outwardly faced on opposite sides of the lower end of said arm, the axis of rotation of said wrench elements being slightly inclined in relation to each other.

4. A device for tightening and removing horizontally axised nuts or bolts from rails, which includes a base frame movably mounted upon a rail of a track, and a power wrench mounted thereon, including an arm mounted for lateral oscillation in relation to said base frame, about a generally vertical axis aligned vertically with the rail on which the base frame rides, said arm being also oscillatable about a horizontal axis, and a pair of wrench elements on said arm, rotatable about a generally horizontal axis, and means for rotating them, the wrench elements being oppositely and outwardly faced on opposite sides of the lower end of said arm, the axis of rotation of said wrench elements being slightly inclined in relation to each other, the wrench carrying end of said arm extending longitudinally substantially beyond the end of the base frame.

5. A device for tightening and removing horizontally axised nuts or bolts from the rails, which includes a base frame movably mounted upon a rail of a track, a second frame mounted upon said base frame for oscillation about a generally vertical axis aligned vertically with the rail on which the base frame rides, and a power wrench mounted on said second frame, including an arm mounted for vertical oscillation in relation to said second frame, about a generally horizontal axis, and a wrench element on said arm, rotatable about a generally horizontal axis, and means for rotating the wrench element.

6. A device for tightening and removing horizontally axised nuts or bolts from rails, which includes a base frame movably mounted upon a rail of a track, and a sub-frame mounted upon said base frame for lateral oscillation about a generally vertical axis aligned vertically with the rail on which the base frame rides, and a power wrench mounted thereupon, including an arm mounted for vertical oscillation in relation to said sub-frame, about a generally horizontal axis, and a pair of wrench elements on said arm, rotatable about a generally horizontal axis, and means for rotating them, the wrench elements being oppositely and outwardly faced on opposite sides of the lower end of said arm.

7. A device for tightening and removing horizontally axised nuts or bolts from rails, which includes a base frame movably mounted upon a rail of a track and extending substantially above the level of the top of said rail, a sub-frame mounted upon said main frame for lateral and generally horizontal oscillation in relation thereto about a vertical axis generally vertically aligned with the rail, a wrench support mounted on said sub-frame for oscillation about a generally horizontal axis, a wrench rotatably mounted adjacent the outer end of said support, the axis of rotation of said wrench being generally horizontal, and means for rotating said wrench selectively in a plurality of directions of rotation.

8. A device for tightening and removing horizontally axised nuts or bolts from rails, which includes a base frame movably mounted upon a rail of a track and extending substantially above the level of the top of said rail, a second frame mounted upon said base frame for lateral and generally horizontal oscillation in relation thereto about a vertical axis generally vertically aligned with the rail, a wrench support mounted on said second frame for oscillation about a generally horizontal axis, a wrench rotatably mounted adjacent the outer end of said support, the axis of rotation of said wrench being generally horizontal, a motor supported by one of said frames, and a drive extending from said motor to said wrench.

9. A device for tightening and removing horizontally axised nuts or bolts from rails, which includes a base frame movably mounted upon a rail of a track and extending substantially above the level of the top of said rail, a sub-frame mounted upon said main frame for lateral and generally horizontal oscillation in relation thereto about a vertical axis generally vertically aligned with the rail, a wrench support mounted on said sub-frame for vertical movement in relation to said sub-frame and the rail upon which the sub-frame is mounted, said wrench support extending substantially beyond the end of the frame, and a pair of wrench elements rotatably mounted upon said support, one at each side thereof, the wrench elements being oppositely faced, the wrench support being movable, at each side of the rail, to a level effective to align the wrench elements with the nuts to be operated upon.

10. A device for tightening and removing horizontally axised nuts or bolts from rails, which includes a base frame movably mounted upon a rail of a track and extending substantially above the level of the top of said rail, a second frame mounted upon said base frame for lateral and generally horizontal oscillation about a vertical axis, a wrench support mounted on said second frame for vertical movement in relation to said base frame and the rail upon which the base frame is mounted, said wrench support extending substantially beyond the end of the base frame, and a pair of wrench elements rotatably mounted upon said support, one at each side thereof, the wrench elements being oppositely faced, the wrench support being movable, at each side of the rail, to a level effective to align the wrench elements with the nuts to be operated upon, and means tending normally to hold said wrench support at a level above the top of the rail.

11. A device for tightening and removing horizontally axised nuts or bolts from rails, which includes a base frame movably mounted upon a rail of a track and extending substantially above the level of the top of said rail, a second frame mounted upon said base frame for lateral and generally horizontal oscillation about a vertical axis, a wrench support mounted on said second frame for vertical movement in relation to said base frame and the rail upon which the base frame is mounted, said wrench support extending substantially beyond the end of the base frame, and a pair of wrench elements rotatably mounted upon said support, one at each side thereof, the wrench elements being oppositely faced, the wrench support being movable, at each side of the rail, to a level effective to align the wrench elements with the nuts to be operated upon, and means tending normally to hold said wrench support at a level above the top of the rail including a coil spring and a connection between said coil spring and one of the frames.

12. A device for tightening and removing horizontally axised nuts or bolts from rails, which includes a base frame movably mounted upon a rail of a track and extending substantially above the level of the top of said rail, a second frame mounted upon said base frame for lateral and generally horizontal oscillation about a vertical axis generally vertically aligned with the rail, a wrench support mounted on said second frame for vertical movement in relation to said base frame and the rail upon which the base frame is mounted, said wrench support extending substantially beyond the end of the base frame, and a pair of wrench elements rotatably mounted upon said support, one at each side thereof, the wrench elements being oppositely faced, the wrench support being movable, at each side of the rail, to a level effective to align the wrench elements with the nuts to be operated upon, and means tending normally to hold said wrench support at a level above the top of the rail, and means for manually thrusting the wrench support effective to align the wrench elements with the nuts to be operated upon.

13. A device for tightening and removing horizontally axised nuts or bolts from rails, which includes a base frame movably mounted upon a rail of a track and extending substantially above the level of the top of said rail, a wrench support supported upon said base frame and mounted for oscillation about a generally horizontal axis, a wrench rotatably mounted adjacent the outer end of said wrench support, said wrench including a shaft and means for rotating it, a squared extension upon said shaft, a wrench socket including an aperture conforming generally to said squared extension, said socket element being rotatably mounted upon said support, and means for maintaining the axis of rotation of said socket member slightly inclined relative to the axis of rotation of said shaft.

14. A device for tightening and removing horizontally axised nuts or bolts from rails, which includes a base frame movably mounted upon a rail of a track and extending substantially above the level of the top of said rail, a wrench support supported upon said base frame and mounted for oscillation about a generally horizontal axis, a wrench rotatably mounted adjacent the outer end of said wrench support, said wrench including a shaft and means for rotating it, a squared extension upon said shaft, a wrench socket including an aperture conforming generally to said squared extension, means for rotatably supporting said wrench socket upon the wrench support with the aperture of the wrench socket in loose engagement with said squared extension and means for maintaining the axis of rotation of the wrench socket inclined with respect to the axis of rotation of said shaft.

15. In a wrench mechanism, a socket support, a shaft on said support and means for rotating it, said shaft including a squared extension, a socket element including an aperture conforming generally to said squared extension and means for rotatably positioning said socket element on the support with said aperture penetrated by said squared extension, including a slide removably mounted on said support, said slide including edges interpenetrating with said socket member.

16. In a wrench mechanism, a base movable along the rail of a track, a socket support mounted upon said base, a socket upon said socket support, a power source mounted on said base, a drive between said power source and socket, and means for reversing the direction of said drive, and means for imparting to said socket, after said reversal of direction, a sudden twisting movement.

17. A machine for tightening and removing nuts of horizontally axised joint bolts extending transversely through one of a pair of track rails, comprising a frame mounted for travel movement on the track from one rail joint to another, an engine mounted on the frame, an arm supported at its rear by the frame and extending with its other end forwardly therebeyond, a pair of outwardly directed nut engageable wrench elements at the forward end of the arm and rotatable about a generally transverse axis with respect to the rail, and power connections from the engine to the wrench elements, the outer end of said arm being oscillatable transversely and vertically, about generally vertical and transverse axes, respectively, at the supported end of the arm, to effect movement of the wrench elements transversely over the top of the rail and down into selective engagement with bolt nuts on opposite sides thereof.

18. A portable machine for tightening and removing nuts of bolts extending transversely through a track rail, comprising a frame supported and movable on the track, a power plant on the frame, a nut engageable wrench unit rotatable about an axis disposed generally transversely of the rail, a support extending from the frame to rotatably secure the wrench unit, said support being manually adjustable to move the wrench unit outwardly and upwardly from a bolt nut at one side of the rail and over the top of the rail and thence downwardly and inwardly into engagement with a bolt nut at the opposite side of the rail, and means for transmitting power from the engine to the wrench unit.

19. A portable machine for tightening and removing nuts of bolts extending transversely through a track rail, comprising a frame supported and movable on the track, a power plant on the frame, a wrench support mounted on the frame and extending longitudinally therebeyond for adjustment in a vertical plane and about a generally horizontal axis, means for counterbalancing the support to facilitate said vertical adjustment, a pair of lateral wrench chucks carried by the support for rotation about a horizontal axis and transversely shiftable therewith across the rail for engagement with nuts at either side of the rail, and means for transmitting power from the power plant to the wrench.

20. A portable machine for tightening and removing nuts of bolts extending transversely through a track rail, comprising a frame supported and movable on the track, a power plant on the frame, an arm carried at its rear end by the frame and with its front end oscillatably shiftable vertically and transversely about generally horizontal and vertical axes, respectively, at its rear, a wrench head carried by the forward end of the arm and including a pair of back-to-back outwardly faced sockets for selective engagement with nuts at opposite sides of the rail, and power connections from the power plant to said wrench head sockets.

21. A portable machine for tightening and removing nuts of bolts extending transversely through a track rail, comprising a frame supported and movable on the track, a power plant on the frame, an arm carried at its rear end by the frame and with its front end oscillatably shiftable vertically and transversely about generally horizontal and vertical axes, respectively, at its rear, a wrench head carried by the forward end of the arm and including a pair of back-to-back outwardly faced sockets for selective engagement with nuts at opposite sides of the rail, and power connections from the power plant to said wrench head sockets, said power connections including an automatic release to stop rotation of the socket when bolt tension develops a predetermined resistance to continued socket rotation.

22. A portable machine for tightening and removing nuts of bolts extending transversely through a track rail, comprising a frame supported and movable on the track, a power plant on the frame, an arm carried at its rear end by the frame and with its front end extending forwardly of the frame and oscillatably shiftable vertically and transversely about generally horizontal and vertical axes, respectively, at its rear, a wrench socket member carried by the forward end of the arm and mounted for rotation about an axis disposed at less than a right angle with respect to the vertical longitudinal plane of the arm whereby the socket member may engage the bolt nut in axial alignment therewith when operating on the same, and means for transmitting power from the power plant to the socket member.

HENRY H. TALBOYS.